(No Model.)

F. VAN PATTEN.
CARRIAGE TOP JOINT.

No. 456,452. Patented July 21, 1891.

Witnesses
H. G. Sutz
H. J. Riley

Inventor
Frederick Van Patten,
By his Attorneys,
C. A. Snow & Co.

THE NORRIS PETERS CO., PHOTO-LITHO., WASHINGTON, D. C.

UNITED STATES PATENT OFFICE.

FREDERICK VAN PATTEN, OF AUBURN, NEW YORK.

CARRIAGE-TOP JOINT.

SPECIFICATION forming part of Letters Patent No. 456,452, dated July 21, 1891.

Application filed October 31, 1890. Serial No. 369,903. (No model.)

*To all whom it may concern:*

Be it known that I, FREDERICK VAN PATTEN, a citizen of the United States, residing at Auburn, in the county of Cayuga and State of New York, have invented a new and useful Carriage-Top Joint, of which the following is a specification.

The invention relates to improvements in carriage-top joints.

The object of the present invention is to improve the construction of stump-joints and to prevent the ears spreading, and also to improve the attachment of the joint to the joint ends and avoid the necessity of welding the parts.

The invention consists in the construction and novel combination and arrangement of parts hereinafter fully described, illustrated in the accompanying drawings, and pointed out in the claims hereto appended.

Figure 1:
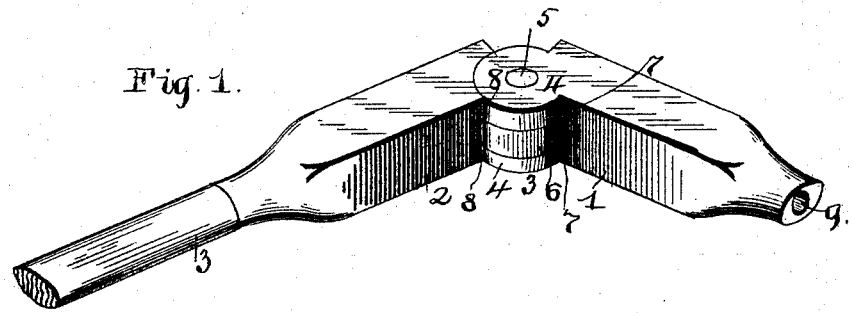
Figure 3:
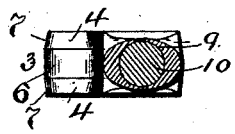
Figure 2:
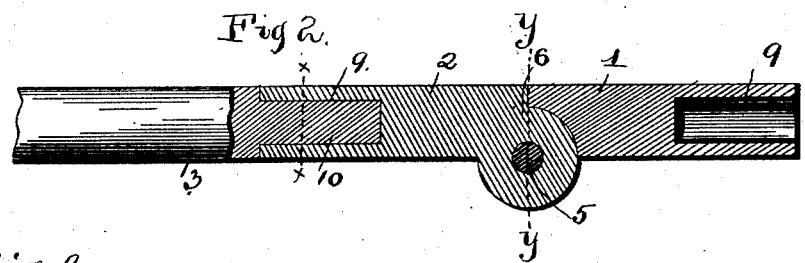
Figure 4:
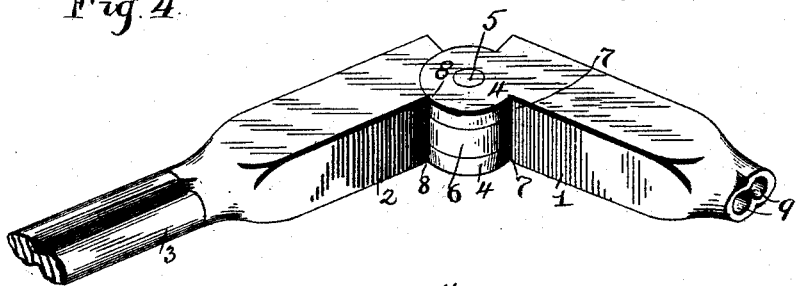
Figure 5:
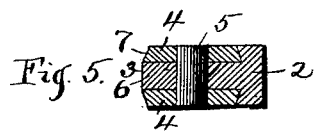

In the drawings, Figure 1 is a perspective view of a stump-joint embodying the invention. Fig. 2 is a longitudinal sectional view illustrating the manner of attaching the joint to the joint ends. Fig. 3 is a sectional view on line $x\,x$ of Fig. 2. Fig. 4 is a perspective view illustrating a different form of socket. Fig. 5 is a sectional view on line $y\,y$ of Fig. 2.

Referring to the accompanying drawings, 1 and 2 designate parts or sections of a stump-joint, constructed of suitable metal, designed to be secured to the joint ends 3. The section 1 is provided with a pair of perforated ears 4, through which passes a pivot 5, which hinges the ear 6 of the section 2 between the ears 4 and to the section 1 in the usual manner. The outer edges of the peripheries 7 of the ears 4 are beveled, and when the parts are assembled the beveled portions fit in dovetail grooves 8 of the section 2, arranged at the inner ends of the opposite faces of the perforated ear 6. The ears 4 fit in the grooves 8 and are prevented spreading, and the strength of the joint is increased.

The parts or sections 1 and 2 are provided at their outer ends with sockets 9, adapted to receive the reduced ends 10 of the joint ends 3, which may be secured therein by brazing or the like, thereby obviating the necessity of welding, by which means the parts are usually secured together. The sockets 9 may be cylindrical, approximately elliptical, oval, or corrugated, as illustrated in Fig. 4, or any other desired shape, and they are adapted to readily receive the joint ends usually required for carriage-tops.

Fig. 4 shows a corrugated joint end fitting in the corrugated socket.

It will be seen that the stump-joints constructed in accordance with this invention are simple and inexpensive and are readily assembled, and after the parts are assembled there is no liability of the ears spreading, and the joints are readily secured to the parts composing the carriage-top joint.

What I claim is—

1. A carriage-top joint comprising the section 1, provided with the parallel perforated ears 4, having their peripheries beveled, and the section 2, having the perforated ear 6 and provided with the dovetail grooves 8, arranged to receive the beveled edges of the ears 4, whereby the parts are prevented spreading, substantially as described.

2. As a new article of manufacture, a stump-joint comprising the section 1, provided with the perforated ears 4, having circumferential beveled edges 7, and the section 2, having the perforated ear 6 and provided with a dovetail groove 8, arranged to receive the circumferential beveled edges 6, said sections being provided in their outer end with sockets 9 to receive the joint ends of a carriage-top, substantially as described.

3. A carriage-top joint comprising the sections 1 and 2, hinged together and provided at their outer ends with corrugated sockets, and the corrugated joint ends fitting in the said sockets, substantially as described.

In testimony that I claim the foregoing as my own I have hereto affixed my signature in presence of two witnesses.

FREDERICK VAN PATTEN.

Witnesses:
L. A. PIERCE,
JAMES LYON.